United States Patent [19]

Ishima

[11] Patent Number: 4,564,749
[45] Date of Patent: Jan. 14, 1986

[54] HEATER DRIVE CIRCUIT FOR CONTROLLING INK TEMPERATURE IN INK JET PRINTER

[75] Inventor: Kazumi Ishima, Kashiwa, Japan

[73] Assignee: Ricoh Company, Ltd., Tokyo, Japan

[21] Appl. No.: 600,718

[22] Filed: Apr. 16, 1984

[30] Foreign Application Priority Data

Apr. 19, 1983 [JP] Japan .................................. 58-68830

[51] Int. Cl.[4] .............................................. H05B 1/02
[52] U.S. Cl. ................................... 219/497; 219/501; 323/281
[58] Field of Search ............... 219/497, 499, 501, 494, 219/483, 486, 211, 302; 307/39, 41; 323/265, 281

[56] References Cited

U.S. PATENT DOCUMENTS

| | | | |
|---|---|---|---|
| 3,901,437 | 8/1975 | Harkins | 219/492 |
| 3,999,190 | 12/1976 | Brown et al. | 219/501 |
| 4,449,032 | 5/1984 | Frerking | 219/501 |
| 4,478,181 | 10/1984 | Kikuchi et al. | 219/497 |

Primary Examiner—M. H. Paschall
Attorney, Agent, or Firm—David G. Alexander

[57] ABSTRACT

A drive circuit for controllably driving a heater which is used for maintaining ink in an ink jet printer at a predetermined temperature. A plurality of power sources are installed in the circuit each for supplying a voltage to the heater. The power sources are selectively connected to the heater by a plurality of output transistors and an error amplifier adapted to control switching actions of the output transistors. Diodes are interposed between the respective transistors and the error amplifier to enhance the linearity of the level of the voltage supplied to the heater.

7 Claims, 3 Drawing Figures

HEATER DRIVE CIRCUIT FOR CONTROLLING INK TEMPERATURE IN INK JET PRINTER

BACKGROUND OF THE INVENTION

The present invention relates to a heater drive circuit and, more particularly, to one suitable for use with, for example, an ink jet printer for driving a heater which is adapted to control the temperature of ink.

An ink jet printer generally employs a heater for controlling the temperature of ink ejected from a head to a predetermined appropriate level. A prior art circuit for driving the heater comprises a sensor responsive to a temperature of the heater, an error amplifier having an inverting input supplied with an output of the sensor and a non-inverting input selectively supplied with a relatively high reference voltage which is applied to the heater at the time of buildup or startup of the heater and a reference voltage applied to the heater to maintain ink at the appropriate temperature, and an output transistor having a base supplied with an output voltage of the error amplifier, a collector connecting to a power source and an emitter connecting to the heater.

In the heater drive circuit having the above construction, little heat is generated at a buildup of the heater because the output transistor consumes only small power at the buildup stage. However, while the heater is under a stationary or normal operating condition for maintaining the appropriate ink temperature, the collector loss at the transistor is large so that substantial heat is generated to increase the power consumption. This requires provision of a heat sink and, therefore, an additional space for accommodating it, resulting in a bulky and expensive construction as a whole.

SUMMARY OF THE INVENTION

It is therefore an object of the present invention to provide a heater drive circuit which efficiently controllably drives a heater during both a buildup stage and a stationary operation.

It is another object of the present invention to providea heater drive circuit which greatly cuts down the loss of power supplied to a heater during a buildup and a stationary operation.

It is another object of the present invention to provide a heater drive circuit which efficiently controllably drives a heater, which is adapted to control the temperature of ink in an ink jet printer, both at a buildup and in a stationary operation.

It is another object of the present invention to provide a generally improved heater control circuit for controlling ink temperature in an ink jet printer.

A heater drive circuit for controlling a temperature of heater of the present invention comprises a sensor for sensing a temperature of the heater, an error amplifier having a first input which is supplied with an output of the sensor, and a second input which is selectively supplied with a first reference voltage which supplies the heater with power necessary for a buildup of the heater and a second reference voltage which supplies the heater with power necessary for a stationary operation of the heater to maintain the heater at a predetermined temperature.

The above and other objects, features and advantages of the present invention will become apparent from the following detailed description taken with the accompanying drawings.

DESCRIPTION OF THE PREFERRED EMBODIMENS

While the heater drive circuit for controlling ink temperature in an ink jet printer of the present invention is susceptible of numerous physical embodiments, depending upon the environment and requirements of use, substantial numbers of the herein shown and described embodiments have been made, tested and used, and all have performed in an eminently satisfactory manner.

Figure 1:
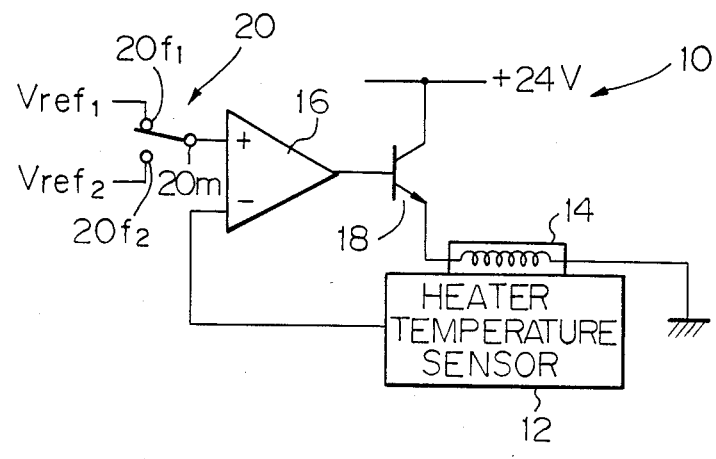
FIG. 1 is an electric circuit diagram representative of a prior art heater drive circuit for controlling the temperature of ink in an ink jet printer.

Before entering into detailed description of the present invention, a reference will be made to a prior art heater control circuit installed in an ink jet printer, shown in FIG. 1. The prior art heater drive circuit, generally 10, includes a sensor 12 for sensing a temperature of a heater 14. The output of the heater temperature sensor 12 is routed to an inverting input of an error amplifier 16. The output voltage of the error amplifier 16 in turn is applied to a base of an output transistor 18 which constitutes an emitter follower. The output transistor 18 is connected at a collector thereof to a +24 V power source and at an emitter to the heater 14. The non-inverting input of the error amplifier 16 is connected to a movable contact 20m of a switch 20. A reference voltage $V_{ref_1}$ necessary for supplying large power to the heater 14 at a buildup is applied to a fixed contact $20f_1$, of the switch 20, while a reference voltage $V_{ref_2}$ necessary for maintaining the heater 12 at a predetermined temperature during a stationary or normal operation is applied to the other fixed contact $20f_2$. Usually, power of about 10 watts is required for a buildup of the heater 12, and that of about 2-3 watts for a stationary operation.

Assuming that the power source voltage is usable to its full extent (e.g. 23 volts), then the resistance of the heater 14 is about 53 ohms and, therefore, power consumed by the transistor 18 is as small as about 0.4 watts resulting in hardly any heat generation. However, during a stationary operation (assuming 3 watts), the heater 14 requires only 12.6 volts so that a voltage of about 12 volts is applied across the collector and emitter of the transistor 18. As a result, a current of about 0.24 amperes flows through the transistor 18 to introduce a collector loss of about 2.9 watts. The resulting substantial heat generated by the transistor has to be accommodated by use of a heat sink.

First and second emboiments of the present invention which are free from the drawback discussed above will be described with reference to the FIGS. 2 and 3.

Figure 2:
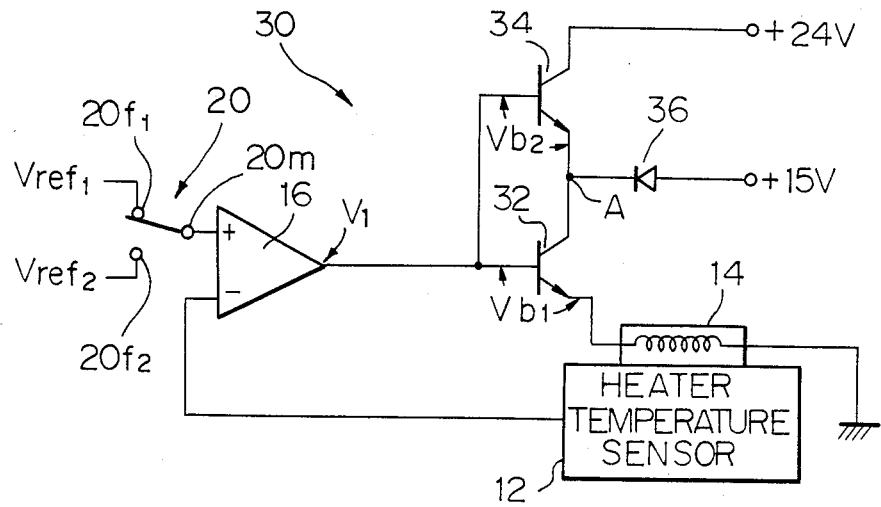
FIG. 2 is an electric circuit diagram representative of a heater drive circuit embodying the present invention.

Referring to FIG. 2, a heater drive circuit in accordance with the first embodiment of the present invention is shown and generally designated by the reference numeral 30. In FIG. 2, the same or similar structural elements as those shown in FIG. 1 are designated by like reference numerals. As shown, the heater drive circuit 30 comprises two output transistors 32 and 34 each having a base which is supplied with an output voltage $V_1$ of an error amplifier 16. The collector of the transistor 34 is connected to a +24 V power source, and the emitter to the collector of the transistor 32. The emitter of the transistor 32 is connected to a heater 14. The junction A of the emitter of the transistor 34 and the collector of the transistor 32 is connected to a +15 V power source via a diode 36. For the simplicity of description, let it be assumed that the diode voltages $Vb_1$ and $Vb_2$ and collector saturation voltage Vce of the transistors 32 and 34 are commonly 1 volt.

Assume that the output voltage $V_1$ of the error amplifier 16 is increased until it reaches 14 volts. Then, a voltage as low as 13 volts is applied to the heater 14 because the diode voltage of the transistor 32 and the collector saturation voltage Vce are commonly 1 volt. Meanwhile, because the diode voltage $Vb_2$ of the transistor 34 is zero volt, the transistor 34 is kept nonconductive so that a current is fed to the heater 14 from the +15 V power source. Upon additional increase of the voltage $V_1$ to 14.5 volts, the transistor 32 reaches saturation to keep the voltage applied to the heater 14 unchanged, that is, at 13 volts. In this instant, the transistor 34 is still remaining in the nonconductive or cutoff condition because its diode voltage $Vb_2$ is 0.5 volt. As the voltage $V_1$ is further elevated to 15 volts, the transistor 34 begins to conduct changing the voltage applied to the heater from 13 volts to 15 volts. In this manner, the circuitry shown in FIG. 2 is effective to remarkably cut down the power loss.

Figure 3:
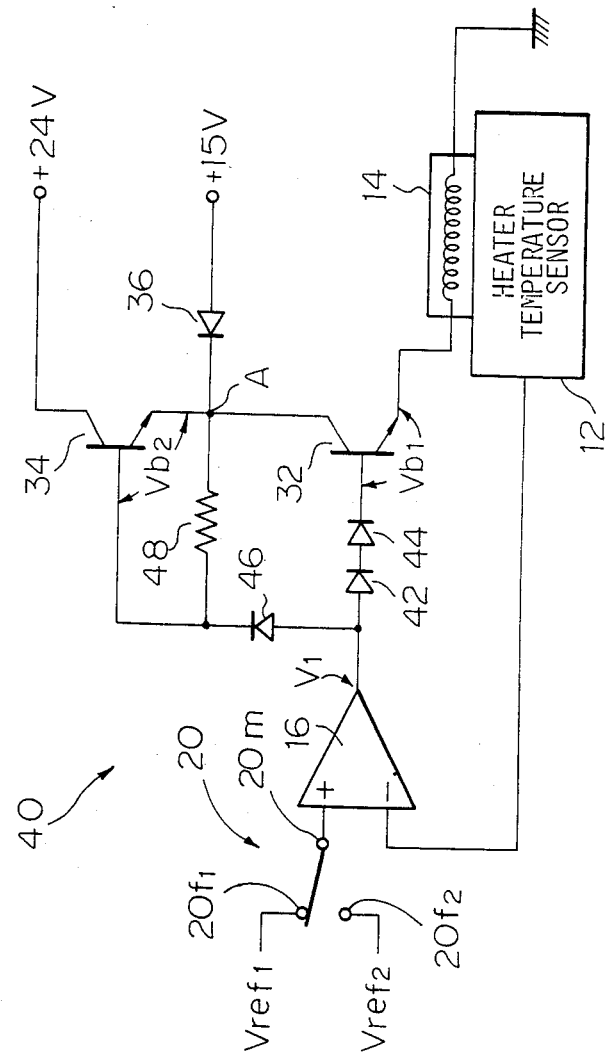
FIG. 3 is a diagram similar to FIG. 2 but showing another embodiment of the present invention.

Referring to FIG. 3, a second embodiment of the present invention is shown and generally designated by the reference numeral 40. In FIG. 3, the same or similar structural elements as those shown in FIG. 2 are designated by like reference numerals. In the heater drive circuit 40, a series connection of diodes 42 and 44 is disposed between the output terminal of the error amplifier 16 and the base of the transistor 32. A diode 46 is connected between the output terminal of the error amplifier 16 and the base of the transistor 34. Further, a resistor 48 is connected between the junction of the diode 46 and the base of the transistor 34 and the junction of the emitter 32 of the transistor 34 and the collector of the transistor 32.

Assuming that the output voltage $V_1$ of the error amplifier 16 is 14 volts, a voltage of 11 volts is applied to the heater 14 by the influence of the diode voltages of the diodes 42 and 44 and the diode voltage $Vb_1$ of the transistor 32. At this instance, since the diode 46 is nonconductive, the diode voltage $Vb_2$ of the transistor 34 is zero volt so that the transistor 34 also remains in the nonconductive or cutoff condition. Upon the rise of the voltage $V_1$ to 14.5 volts, the transistor 34 still remains nonconductive because the heater voltage is 11.5 volts and the diode voltage $Vb_2$ of the transistor 34 is 0.5 volt. Upon the further rise of the voltage $V_1$ to 15 volts, the heater voltage increases to 12 volts and the diode voltage $Vb_2$ of the transistor 34 to 1 volt, causing the transistor 34 to begin to conduct. As the voltage $V_1$ is increased to 16 volts, the heater voltage becomes 13 volts and the transistor 34 becomes fully conductive, whereby the heater 14 is supplied from both the +24 V power source and the +15 V power source. Further increasing the voltage $V_1$ to 20 volts sets up a heater voltage of 17 volts, makes the voltage at the junction A 18 volts, and reversely biases the diode 36, thereby cutting off the supply from the +15 power source to the heater 14. The heater drive circuit having such a construction reduces the power loss in the stationary operation to (14 volts − 12.6 volts) × 0.24 amperes ≈ 0.34 watts and, thereby, suppresses heat generation to eliminate the need for a special dissipator or the like.

It should be noted that the diodes 42, 44 and 46 are level shifting diodes and their number depends upon the transistors used and is not limited to the illustrative embodiment.

The resistor 48 serves to reversely bias the transistor 34 in order to surely cut off the transistor 34 and is omissible for some applications.

The diode 36 is adapted to prevent a current from flowing into the +15 V power source when the power source is switched to the +24 V power source.

While preferred embodiments of the present invention have been shown and described using concrete numerical values, it will be apparent to those skilled in this art that such is not limitative and only illustrative.

In summary, it will be seen that the present invention provides a heater drive circuit which cuts down power loss at an output transistor during a stationary operation of a heater, supplies sufficiently large power at a buildup of the heater, and effects a linear temperature control.

Various modifications will become possible for those skilled in the art after receiving the teachings of the present disclosure without departing from the scope thereof.

What is claimed is:

1. A heater drive circuit for controlling a temperature of a heater, comprising:
    a sensor for sensing a temperature of the heater;
    an error amplifier having a first input which is supplied with an output of said sensor, and a second input which is selectively supplied with a first reference voltage which supplies the heater with power necessary for a startup of the heater and a second reference voltage which supplies the heater with power necessary for a stationary operation of the heater to maintain the heater at a predetermined temperature;
    a first output transistor having a base supplied with an output voltage of the error amplifier and switching a supply of a first power source voltage to the heater;
    a second output transistor having a base supplied with an output voltage of the error amplifier and switching a supply of a second power source to the heater;
    at least one diode connected between an output of the error amplifier and the first output transistor for shifting a level of an output voltage of the error amplifier; and
    at least one diode connected between the output of the error amplifier and the second output transistor for shifting a level of an output voltage of the error amplifier;
    each of the diodes being selected such that the level of the voltage applied to the heater is varied linearly without a sharp change.

2. A heater drive circuit as claimed in claim 1, in which the first power source voltage is lower than the second power source voltage.

3. A heater drive circuit as claimed in claim 1, further comprising a switch for selectively supplying the first and second reference voltages to the second input of the error amplifier.

4. A drive circuit for a heater including a first voltage source and a second voltage source, the second voltage source supplying a voltage higher than the first voltage source, characterized by comprising:
- a first transistor connected between the first voltage source and the heater;
- a second transistor connected between the second voltage source and the first transistor;
- an input terminal connected to bases of the first and second transistors; and
- diode means comprising said connection of the input terminal to the base of the first transistor, the diode means having characteristics selected to prevent the first transistor from reaching saturation at an input terminal voltage at which the second transistor begins to turn on.

5. A drive circuit as claimed in claim 4 further comprising a resistor connected between the base and an emitter of the second transistor for reverse biasing the second transistor at input terminal voltages below the voltage of the first voltage source.

6. A drive circuit as claimed in claim 5, further comprising a diode connected between the input terminal and the resistor and comprising said connection of the input terminal to the base of the second transistor for preventing current flow through the resistor to the input terminal.

7. A drive circuit as claimed in claim 6, in which the characteristics of the diode means are further selected to compensate for a voltage drop across the diode.

* * * * *